United States Patent [19]

Abe

[11] Patent Number: 4,520,395
[45] Date of Patent: May 28, 1985

[54] SYSTEM FOR CORRECTING SHADING OR NON-UNIFORMITY IN A PHOTOSENSITIVE ELEMENT ARRAY

[75] Inventor: Takahiko Abe, Tokyo, Japan

[73] Assignee: Tokyo Shibaura Denki Kabushiki Kaisha, Japan

[21] Appl. No.: 502,627

[22] Filed: Jun. 9, 1983

[30] Foreign Application Priority Data

Aug. 4, 1982 [JP] Japan .................................. 57-136680

[51] Int. Cl.³ .......................... H04N 5/14; H04N 1/40
[52] U.S. Cl. .................................... 358/163; 358/282
[58] Field of Search ............... 358/163, 282, 284, 206, 358/293, 208, 213, 212; 382/53, 41

[56] References Cited

U.S. PATENT DOCUMENTS

| | | | |
|---|---|---|---|
| 3,590,152 | 11/1968 | McDonald et al. | 358/164 |
| 3,790,705 | 2/1974 | Kamin | 358/163 |
| 3,800,078 | 3/1974 | Cochran et al. | 382/50 |
| 4,343,021 | 8/1982 | Frame | 358/163 |
| 4,491,961 | 1/1985 | Sutton et al. | 358/284 |

FOREIGN PATENT DOCUMENTS 53-127945 10/1978 Japan .
54-125639 9/1979 Japan .

Primary Examiner—John C. Martin
Assistant Examiner—David E. Harvey
Attorney, Agent, or Firm—Banner, Birch, McKie & Beckett

[57] ABSTRACT

The invention is directed to a system for correcting shading or non-uniformities in the output of a linear photosensitive array. The invention employs a memory circuit having a number of cells corresponding to the number of photoelements positioned along the linear array. The sensor output of each respective element is successively compared with the data value stored in a corresponding memory cell in the memory. The data stored in the memory is updated by determining the larger data value signal and then storing that signal in the corresponding memory cell. This comparison and storage operation continues for each successive output signal produced by the linear array. The data stored in memory for each line represents the non-uniformity of the photosensor system including non-uniformities due to light source, lens, optical transmission and sensor characteristics. The stored data for each line is then converted in accordance with a weighting factor; the resulting converted data is multiplied by the received sensor output to produce sensor output response signals that compensate for the non-uniformities.

7 Claims, 5 Drawing Figures

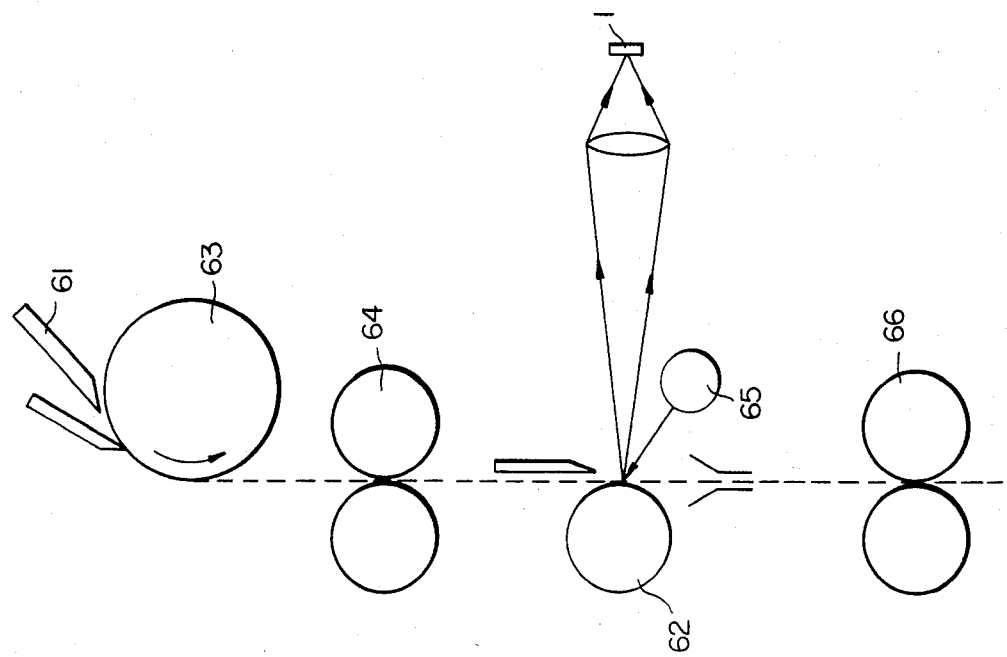
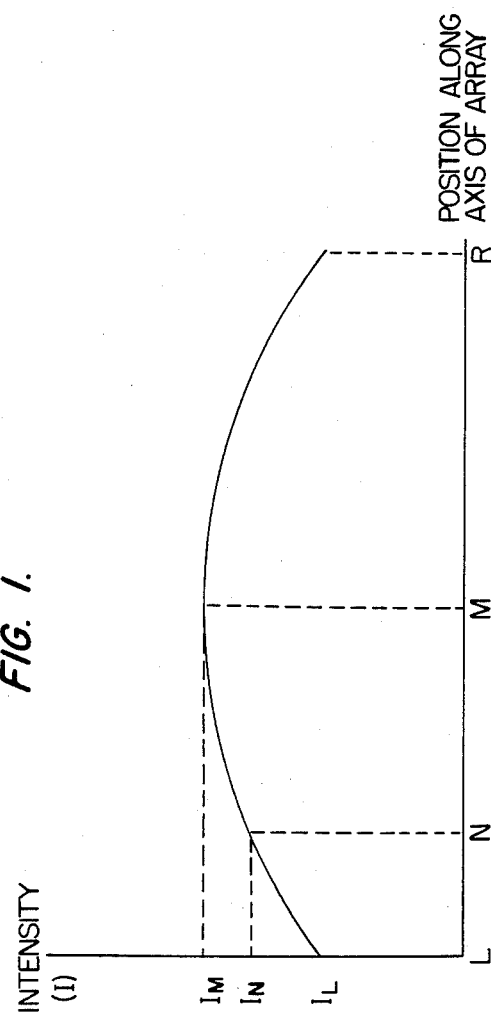
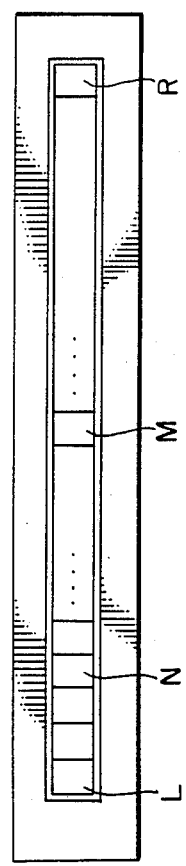

4,520,395

SYSTEM FOR CORRECTING SHADING OR NON-UNIFORMITY IN A PHOTOSENSITIVE ELEMENT ARRAY

BACKGROUND OF THE INVENTION

This invention relates to a system for correcting shading or non-uniformity which occurs in the output of an array of photosensitive elements used in picture image apparatus such as electric printers, facsimile or optical character recognition (OCR) systems.

The phenomenon called shading occurs in the output of photosensitive elements. In accordance with this phenomenon the photosensitive array produces an output which varies as the position of the impinging light along the surface of the photoarray. FIG. 1 shows the characteristics of a linear sensor array for a given image tone. As shown in FIG. 1, the intensity of output signal will be higher at the center of the sensor array than at its edges. This produces undesirable results in the reproduced printed copy. That is, the original is inaccurately read and the printed copy has intensity graduations resulting in inaccurate reproduction of the original. In some cases, the output will vary more randomly due to the inherent nonuniform characteristics or sensitivity among the various array elements. This is a further factor causing an undesirable output.

There are three recognized causes of shading or non-uniformities of sensor output: array elements having non-uniform sensitivity; non-uniformity of certain light sources (e.g., fluorescent lights); and inherent characteristics of lens systems to vary light intensity along surface of array. In particular, in constructing a sensor array it is virtually impossible to produce a multitude of sensor elements each having identical output characteristics; as a result, the output of each element will be different for a given image tone and intensity of impinging light. The resulting output has a random intensity depending upon the characteristic of each adjacent element even though each sensor may receive light from the same image tone. Without some correction, the resulting printed copy will have graduations in intensity and will be commercially undesirable.

The second cause of non-uniformity are certain light sources. For example, fluorescent light sources produce an output intensity which is constant at its center portion but is substantially reduced at its edges. While attempts have been made to use a very long fluorescent source whereby only the centermost region supplies the desired light, this has necessarily resulted in a very large and impractical reproduction facsimile system. Some light sources, moreover, have characteristics which change due to sputtering of the filament caused by aging. As a result, the output of the source will vary nonuniformily along its length to a greater degree, producing even more severe degradation in reproduced printed copy.

Finally, in some reproduction system, a lens system is used to focus the light image on the array. Such systems, however, compounded the non-uniformity problem discussed above due to the inherent characteristics of lenses. That is, a lens has the characteristic of transmitting light of varying intensity along its surface (See, e.g., Optics by Hiroshi Kubota, Iwanami Shoten Publishing Co., Toyoko, September 1975).

One prior art method provides some correction for the characteristics shown in FIG. 1 by utilizing a correcting board positioned between the document and the lens system. The board is opaque and has a particular shape to gradually prevent passage of light from the centermost portion of the document to the detector. Consequently, the more intense light at the center will be reduced to substantially equal the light intensity at the edges of the detector. In attempting to achieve uniformity of light with a correcting board, it must be specially designed and oriented differently for each case since the characteristics of each light source is different. Practically, however, the board design has never achieved complete uniformity of output intensity for a given tone image and has required the costly and time consuming process, during manufacturing of adjusting and orienting each board.

Another prior art method utilizes a lamp shading plate or cover which corrects for the non-uniformity of the lamp (see, Japanese Utility Model Publication No. 53-15211, Apr. 21, 1978). This method, however, does not correct for non-uniformity of the photoelements or aging of the lamp.

A further prior art method employs an opaque slotted lamp cover plate (see, e.g., Japanese Utility Model Publication No. 52-16121, Apr. 12, 1977). The width of the slots are varied to correct for the non-uniformity light intensity of the lamp. this method does not correct for non-uniformity of the photoelements or aging of the lamp.

A still further prior art method is disclosed in Japanese Utility Model Publication No. 28-12984, Dec. 28, 1953. This method utilizes two spaced, curved reflector plates, each positioned around a portion of the outside surface of the lamp adjacent a respective end. The reflector plate aids in slightly increasing the light intensity at the ends of the lamp. While some improvement is provided by the reflector plates, there remains substantial non-uniformity along the surface of the lamp.

SUMMARY OF THE INVENTION

One object of the present invention is to provide a system for correcting non-uniformities or shading errors in the output of a photosensor array.

A further object of the present invention is to substantially eliminate shading caused by non-uniformities in the sensitivity of the sensor elements.

A still further object of the present invention is to substantially eliminate shading caused by non-uniformities of certain light sources.

Another object of the present invention is to substantially eliminate shading caused by the inherent characteristics of the lens system.

Another further object of the present invention is to correct shading due to aging of the lamps.

A still further object of the present invention is to correct shading without utilizing the costly and time consuming prior art methods previously discussed.

The invention is directed to a system for correcting shading or non-uniformities in the output of a linear photosensitive array. The invention employs a memory circuit having a number of cells corresponding to the number of photoelements positioned along the linear array. The sensor output of each respective element is successively compared with the data value stored in a corresponding memory cell in the memory. The data stored in the memory is updated by determining the larger data value signal and then storing that signal in the corresponding memory cell. This comparison and storage operation continues for each successive output signal produced by the linear array. The data stored in memory for each line represents the non-uniformity of the photosensor system including non-uniformities due to light source, lens, optical transmission and sensor characteristics. The stored data for each line is then converted in accordance with a weighting factor; the resulting converted data is multiplied by the received sensor output to produce sensor output response signals that compensate for the non-uniformities.

BRIEF DESCRIPTION OF THE DRAWINGS

FIG. 1 is a response curve showing the non-uniformity or shading characteristics of a linear sensor array receiving light from a surface having a constant image tone.

FIG. 2 shows a linear photosensor array having a plurality of photosensitive elements.

FIG. 5 shows the use of a white roller in the system of the invention to accurately determine the non-uniformity of the sensor array irrespective of noise level, type, and image tones of the document being read.

DETAILED DESCRIPTION OF THE INVENTION

The invention will now be explained with reference to the accompanying drawings.

Figure 3:
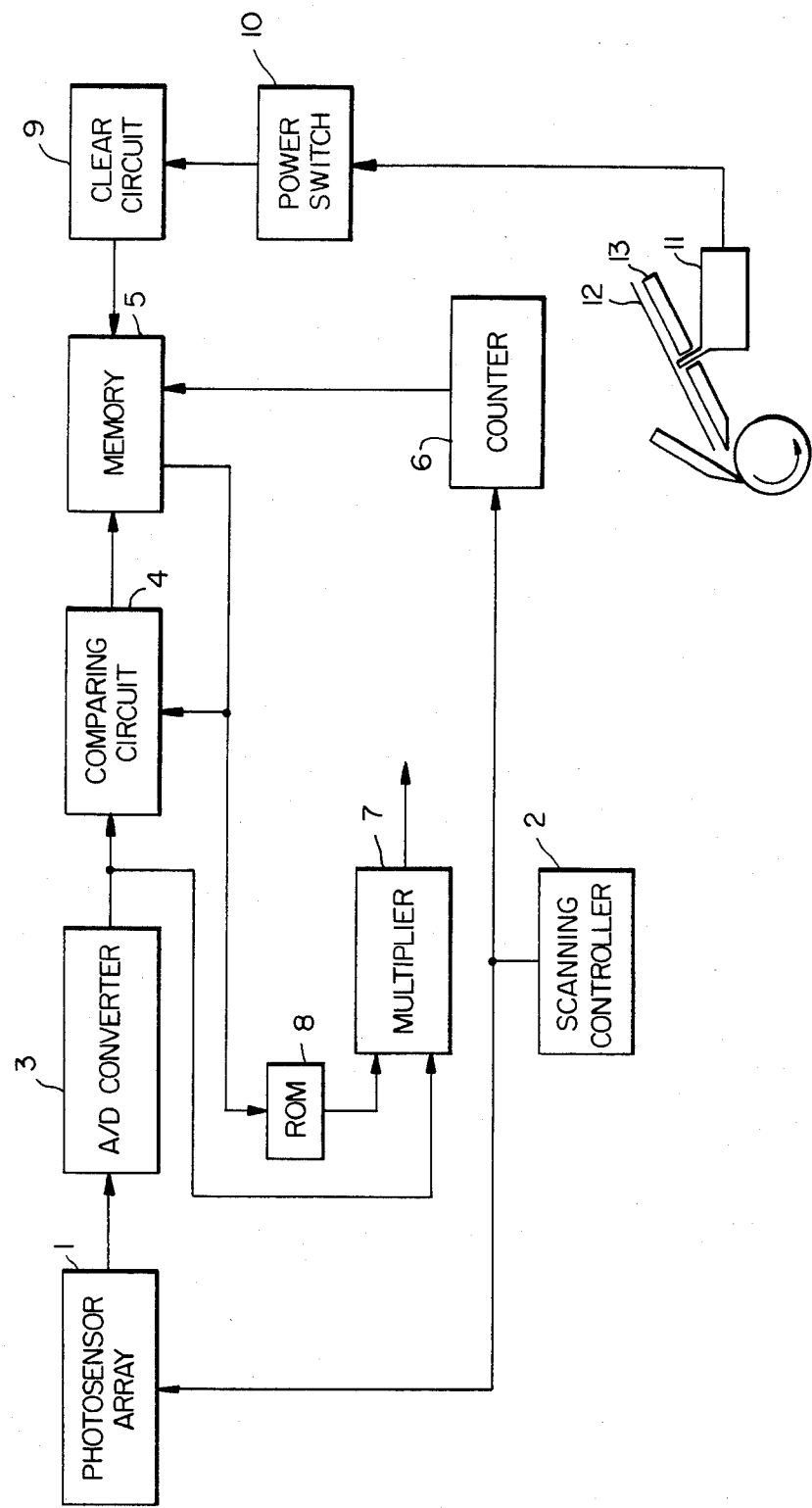
FIG. 3 is a block diagram showing the system in accordance with the invention correcting the non-uniformity of the sensor output.

FIG. 3 is a block diagram for explaining one embodiment of the invention for correcting non-uniformity of the sensor output. As shown, an array 1 of photosensitive elements are used to receive the light image. Array 1, for example, consists of approximately 1728 Charge Coupled Devices (CCD). An array of 1728 elements correspond to an A4 document size, while an array of 2048 elements correspond to a B4 document size. The light image reflected from the document impinges upon the elements which, in turn, are scanned by scanning signals from a scanning controller 2. As a result, photosensor output signals for each cell are successively generated. Controller 2 comprises a clock generator which synchronously supplies scanning pulses to shift the signal stored in each element and, thereby, scans array 1. The output signals from the photosensor elements are supplied to an A/D converter 3. Converter 3 converts these analog signals into digital signals having, for example, an 8 bit byte.

The output signal of A/D converter 3 is then supplied to a comparing circuit 4. Comparing circuit 4 compares the digital signal for each element with data stored in a memory 5. Memory 5 has a number of memory cells corresponding to the number of photosensor elements. The output of each respective element is successively compared with the data value stored in a corresponding memory cell. The data stored in memory 5 is updated by determining the larger data value signal and then storing that signal in the corresponding memory cell.

As discussed, memory circuit 5 has a number of addresses corresponding to the number of photosensor elements. For an A4 document size, the number of the elements is 1728 and, therefore, the number of addresses is 1728. For a B4 document size, the number of elements is 2048 and, therefore, the number of addresses is 2048. The desired cell of memory 5 is addressed by a counter 6 which successively addresses cells. Counter 6 receives the scanning signals from controller 2 so that the successive addressing of memory 5 occurs in synchronism with the scanning of array 1. Counter 6 is reset by a start signal from scanning controller 2 at the beginning of a scanning line. Therefore, when the output signal corresponding to a certain element is supplied to comparing circuit 4 the data value signal stored at a corresponding cell in memory 5 is synchronously supplied to circuit 4 for comparison. Circuit 4 determines the larger of the two signals and supplies that signal to this corresponding cell for storage.

The comparison and storage operation continues for each successive output signal provided by linear array 1. The data stored in memory 5 will approximate the curve of FIG. 1; thus, the data represents the non-uniformity of the photosensor system including the non-uniformities due to the light source, lens optical transmission and sensor characteristics. As will be discussed, the system is designed to obtain the maximum intensity values at each element location such that the stored values represent the intensity values for a particular image tone. In this way, stains or noise on the document will not affect the correcting process of the invention. This correcting process is accomplished by comparision circuit 4 which updates the data value stored in a corresponding cell if a larger photoelement data value is detected. That is, when the next adjacent line is scanned the digital output signal of a photoelement will be stored in the corresponding memory cell if the output signal value is greater than the previously stored value for that element. Since documents generally include some white background portions or borders, these portions will produce the greatest intensity values. Thus, the system will generally store data values in memory 5 which represent the light intensity received by the array from a uniform white background. Thus, memory 5 will store data representing the non-uniformity of the photosensor system despite the presence of stains, blemishes, noise or other dark tones on the document.

In summary, the comparison updating process is utilized so that a data value is obtained for each element which represents the light intensity from a given image tone. While it is not possible in all cases for each sensor to receive light, at least once, from a given tone, the updating process will permit storage of values which approximate the curve of FIG. 1.

The stored data is then converted in accordance with a weighting factor stored in ROM 8. Each resulting converted data is then multipled by its corresponding sensor output to produce output response signals for line that compensate for the non-uniformities of the system. In particular, the output of memory 5 is supplied to ROM 8 which stores the weighting factor: $y = a/x$, where a is a constant, x is the intensity level data supplied from memory 5, and y is the converted output data. One input of multiplier 8 receives the output of A/D converter 3 and the other multiplier input receives the output of ROM 8. As can be seen from the intensity values I of the response curve (FIG. 1) and the weighting factor equation, the weighting factor y will be smallest at the center M of the document and will uniformly increase toward either end (R, L). Thus, the photosensor output signal from the centermost element M will be multiplied by the smallest weighting factor $Y_M$, while rightmost and leftmost element outputs will be multiplied by the largest weighting factor $Y_R$ and $Y_L$, respectively. Consequently, for a given tone, the output signals of multiplier 7 will be substantially uniform. That is, for a line having a given tone, the output signals will be substantially equal. However, while the output signals will vary for a line having various tones, the difference among the signal levels will be due only to the various tones and not to the shading errors.

Also shown in FIG. 3 is a clear circuit 9, coupled to memory 5, for clearing the memory upon turning on the power source. Power switch 10 turns on the power in response to activating microswitch 11. In particular, microswitch 11 senses the presence of a document 12 on document reader guide 3 and activates power switch 10 which turns on clear circuit 9 for clearing memory 5.

Figure 4:
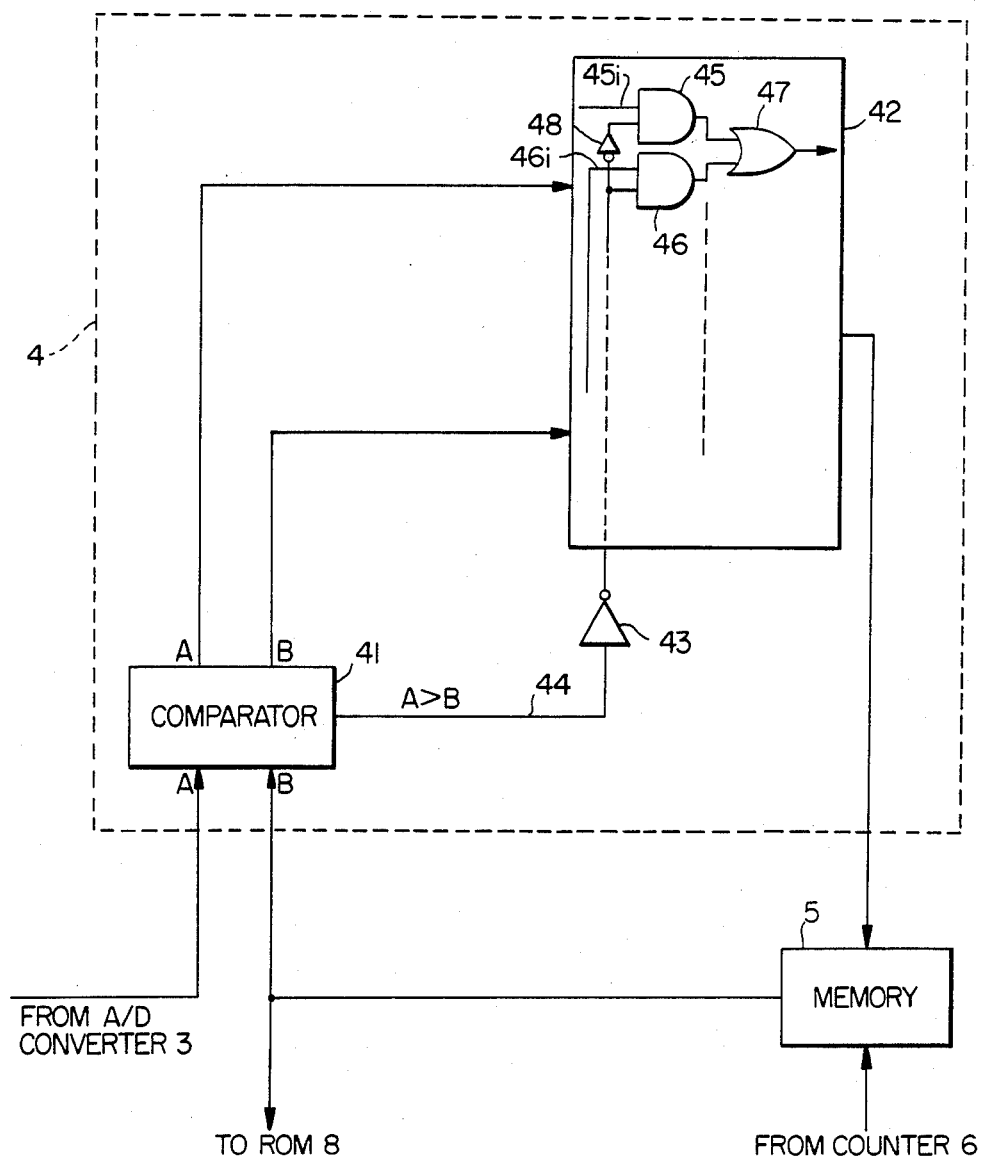
FIG. 4 shows in detail the comparing circuit 4 of FIG. 2.

FIG. 4 describes, in detail, comparing circuit 4 which comprises comparator 41, gating circuit 42, and inverter 43. Comparator 41 receives an 8 bit signal A from the A/D converter 3 and an 8 bit signal B from memory 5; signals A and B are compared. If A>B, a high level signal is supplied on line 44, and signal A and signal B are supplied to gating circuit 44. If A≦B, a low level signal is supplied on line 44, and signals A and B are supplied to gating circuit 44.

Gating circuit 42 comprises 8 sets of gates, each gate set corresponding to a bit and comprising a first AND gate 45, a second AND gate 46, an OR gate 47 and an inverter 48. The remaining set of gates are not shown in FIG. 4. The first bit line of signal A is supplies to one input terminal 45i of gate 45, and the first bit line of signal B is supplied to one input terminal 46i of second AND gate 46. The second bit line of signal A is supplied to one input of a first AND gate of the next gate set, while the second bit line of signal B is supplied to the other input of the first AND gate and second AND gate of the second set. The gate signal from inverter 43 is supplied via inverter 48 to the other input terminal of AND gate 45, and is also supplied to the other input terminal of AND gate 46. The output signals of AND gate 45 and AND gate 46 are supplied to memory 5 via OR gate 47. Therefore, if a high level signal is supplied from comparator 41 on line 44, AND gate 45 will be activated so that output signal A will be supplied via gate circuit 42 and stored in memory 5. If, however, a low level signal is supplied on line 44 from comparator 41, AND gate 46 and the other corresponding AND gates for signal B will be activated so that the output signal B will be supplied via gate circuit 42 and stored in memory 5.

With references to FIGS. 3-4, the operation of the system will be explained. The output of memory 5 is an 8 bit signal (0-255). The input to ROM 8 is signal x from memory 5 such that ROM 8 produces an output y wherein $y = a/x$. The output y is a 14 bit signal (0-16383), wherein the constant $a = 16,384$. If the x address in ROM 8 is 96 (i.e., $x = 96$), then the y output of ROM 8 is 171. That is, $16384/96 = 170.6$, where 170.6 is rounded off to its nearest whole number. If the x address is 128, the y output will be 128. Likewise, if the x address is 192 the y output is 85.

The remaining values for y are likewise stored in ROM 8 at their respective addresses with only the following two exceptions. First, for the $x = 0$ address, the y value is selected as 0. Second, for the $x = 1$ address, the y value is selected as 16383, rather than 16384, since the ROM output is designed for 14 bits.

With reference to FIGS. 1-2, the $x = 96$ address corresponds to element L, the $x = 192$ address corresponds to element M. In the case from white paper, element L produces an intensity output value from A/D converter 3 of 96 (i.e., $I_L$), element N produces a value 128 (i.e., $I_N$), and element M produces an output value of 192 (i.e., $I_M$). The corresponding outputs of multiplier 7 for each of these elements are, therefore, 16416 ($171 \times 96$) for element L, 16384 ($128 \times 128$) for element N, and 16320 ($192 \times 85$) for element M. Consequently, the output signals are substantially equal for a given tone, thus the shading errors are substantially eliminated.

If a gray document with a continuous gray tone boarder immediately follows the white document, the output of A/D converter 3 will be 48, 64 and 96, respectively, for L, N and M. This is because the gray tones produce half the output intensity of the white tones. Since this document immediately follows the white document, memory 5 is not cleared, the corresponding data values stored in memory 5 are 96, 128 and 192, respectively. Since the stored values are greater than the output values of A/D converter 3, the existing stored values in memory 5 will not be updated. Consequently, the respective output signals from ROM 5 will remain 171, 128 and 85. As a result, the respective outputs of multiplier 7 will be half as much as was produced for the white document: 8208, 8192 and 8160. Likewise, these output signals are substantially equal for the gray tone line; consequently the shading errors are substantially eliminated. The pattern images which follow the gray border and are subsequently read by the sensors will likewise have their corresponding output signals modified to reduce the effects of shading errors. The weight of the converted output signals produced by ROM 5 will likewise depend upon the particular photoelement output signals that are being processed in accordance with the expression $y = a/x$.

It is desirable in utilizing the correction system of the instant invention to store the complete and accurate shading or non-uniformity pattern (e.g., FIG. 1) before the image or pattern information is read to accurately compensate for the non-uniformities. In most cases, this will be done. Generally, documents have an upper horizontal border consisting of a non-black single tone (e.g., white) before the image or pattern begins. In that case, the initial data values produced and stored in memory 5 will correspond to FIG. 1 and accurately portray the non-uniformity pattern. If the document has no upper border space, or is black with a white pattern, or has excessive noise, it would not be possible to obtain complete and accurate shading information until the document is nearly completely scanned. As a result, complete compensation for shading will not occur. To overcome that problem, the invention could incorporate a white roller 62 as shown in FIG. 5. As shown, a roller 62 having a white surface is positioned along the path of the document. The document moves along a path from guide plate 61 via feed rollers 63, transport pinch rollers 64 and output supply rollers 66. Roller 62 is positioned to reflect light from lamp 65 onto sensor array 1. Thus, as the document is being transported toward this reading position, light reflected from the single tone surface of roller 62 is processed by the system of the invention to record the non-uniformity pattern of the system.

I claim:

1. A system for correcting non-uniformities in the output of a photosensor system comprising:
   an array of photosensitive elements for reading a pattern image on a document and for producing a series of output signals corresponding to said image;

a storage means, coupled to said array and having a number of memory cells each corresponding to a respective photosensitive element, for storing data representing the non-uniformity characteristics of the photosensor system;

a comparing means for successively comparing the signal from each element with the data stored in a corresponding memory cell and updating the data stored in said storage means in accordance with the results of said comparison; and correcting means, coupled to the storage means and said photosensor array, for correcting the output signals of said photoelements by producing sensor output response signals that are compensated for said non-uniformities.

2. The system of claim 1 wherein said comparing means determines the larger data value between said stored data and the signal from the sensor element, said comparing means further comprising a rewriting means for rewriting said larger data value in said corresponding memory cell.

3. The system of claim 1 wherein said correcting means comprises:

memory converting means for converting the updated stored data in accordance with a weighting factor and producing a converted output signal; and multiplier means for multiplying said converted output signal and said photoelement output signals and producing said sensor output response signals.

4. The system of claim 1 further comprising:

a converting means coupled to said photosensitive elements for converting the output signals of the elements to digital data signals and supplying said digital signals to said comparing means.

5. The system of claim 3 wherein said memory converting means converts the updated stored data in accordance with the factor $y = a/x$, where x is the updated data value, a is a constant and y is the converted output signal.

6. The system of claim 1 wherein the storage means includes means for clearing the memory upon turning on the power source.

7. The system of claim 1 wherein the photosensitive array detects the light reflected from a white surface before reading the document.

* * * * *